(12) United States Patent
Harada et al.

(10) Patent No.: US 11,226,257 B2
(45) Date of Patent: Jan. 18, 2022

(54) ANOMALY DETECTION DEVICE FOR FLUID CONTROLLER, ANOMALY DETECTION SYSTEM, ANAMOLY DETECTION METHOD, AND FLUID CONTROLLER

(71) Applicant: Fujikin Incorporated, Osaka (JP)

(72) Inventors: Akihiro Harada, Osaka (JP); Kouji Nishino, Osaka (JP); Ryousuke Dohi, Osaka (JP); Koji Kawada, Osaka (JP); Katsuyuki Sugita, Osaka (JP); Nobukazu Ikeda, Osaka (JP); Michio Yamaji, Osaka (JP); Tsutomu Shinohara, Osaka (JP); Ryutaro Tanno, Osaka (JP); Yuto Kawauchi, Osaka (JP)

(73) Assignee: Fujikin Inc., Osaka (JP)

( * ) Notice: Subject to any disclaimer, the term of this patent is extended or adjusted under 35 U.S.C. 154(b) by 184 days.

(21) Appl. No.: 16/481,832

(22) PCT Filed: Feb. 6, 2018

(86) PCT No.: PCT/JP2018/004006
§ 371 (c)(1),
(2) Date: Jul. 30, 2019

(87) PCT Pub. No.: WO2018/150949
PCT Pub. Date: Aug. 23, 2018

(65) Prior Publication Data
US 2019/0360887 A1    Nov. 28, 2019

(30) Foreign Application Priority Data

Feb. 20, 2017  (JP) .............................. JP2017-028654

(51) Int. Cl.
*G01M 3/24* (2006.01)
*G01M 3/32* (2006.01)

(52) U.S. Cl.
CPC ............ *G01M 3/24* (2013.01); *G01M 3/3272* (2013.01)

(58) Field of Classification Search
CPC ...................................................... G01M 3/24
See application file for complete search history.

(56) References Cited

U.S. PATENT DOCUMENTS

| 3,130,954 A * | 4/1964 | Mcfarland, Jr. | ........ F16K 7/126 251/331 |
| 2007/0068225 A1* | 3/2007 | Brown | ................ G01M 3/2876 73/40.5 A |

(Continued)

FOREIGN PATENT DOCUMENTS

| JP | 02-091933 A1 | 7/1990 |
| JP | H04-009376 A1 | 1/1992 |

(Continued)

OTHER PUBLICATIONS

Japanese Office Action for Japanese application corresponding to U.S. Appl. No. 16/481,832.

*Primary Examiner* — Paul M. West
*Assistant Examiner* — Mark A Shabman
(74) *Attorney, Agent, or Firm* — Chris Mizumoto

(57) ABSTRACT

A fluid controller is provided having a flow path through which a fluid can flow, a closed space separated from the flow path by an isolation member, and a leak port capable of communicating the closed space with an external part. An anomaly detection device for detecting an anomaly has a pressure sensor detachably fixed to the leak port, a pressure sensor for detecting the pressure in the closed space, a processing module for executing a predetermined information processing, and an detachable mechanism for blocking (Continued)

the leak port from the external part in the state of being fixed. The processing module determines an anomaly of the fluid controller by comparing a detection value detected by the pressure sensor to a predetermined threshold, and transmits a discrimination result of the anomaly of the fluid controller to a server.

16 Claims, 10 Drawing Sheets

(56) References Cited

U.S. PATENT DOCUMENTS

| | | |
|---|---|---|
| 2009/0043506 A1 | 2/2009 | Breed |
| 2010/0288385 A1* | 11/2010 | Gagne .................. F16K 11/027 137/862 |
| 2013/0231874 A1 | 9/2013 | Wilke |
| 2014/0041738 A1* | 2/2014 | Coleman ............. F16K 37/0041 137/510 |
| 2015/0143876 A1* | 5/2015 | Dohi ..................... G01M 3/243 73/40.5 A |
| 2016/0245422 A1 | 8/2016 | Metals |

FOREIGN PATENT DOCUMENTS

| | | |
|---|---|---|
| JP | 04-093736 A1 | 3/1992 |
| JP | H05-126669 A1 | 5/1993 |
| JP | 07-306721 A1 | 11/1995 |
| JP | 08-105813 A1 | 4/1996 |
| JP | 10-318385 A1 | 12/1998 |
| JP | 2007-248278 A1 | 9/2007 |
| JP | 2011-005880 | 1/2011 |
| JP | 2013-037881 | 2/2013 |
| JP | 2014-021029 A1 | 2/2014 |
| JP | 2014-21029 A1 | 2/2014 |
| JP | 2015-528196 A1 | 10/2015 |
| JP | 2016-023928 A1 | 2/2016 |
| JP | 105593587 A1 | 5/2016 |
| WO | WO2015045987 A1 | 2/2015 |

* cited by examiner (a)

(b)

ANOMALY DETECTION DEVICE FOR FLUID CONTROLLER, ANOMALY DETECTION SYSTEM, ANAMOLY DETECTION METHOD, AND FLUID CONTROLLER

CROSS-REFERENCE

This application is a national phase of an international application, PCT/JP2018/004006 filed on Feb. 6, 2018, which claims the benefit of Japanese Application No. 2017-028654 filed on Feb. 20, 2017.

The present invention relates to an anomaly detection device for a fluid controller, an anomaly detection system, an anomaly detection method, and a fluid controller.

FIELD OF THE INVENTION

The present invention relates to a technique for detecting fluid leakage in a fluid control device.

BACKGROUND OF THE INVENTION

Conventionally, a film forming process to form thin films on surfaces of semiconductor wafers required miniaturizing the thin films, and in recent years a film forming method called ALD (Atomic Layer Deposition) has been used for forming a thin film with an atomic or molecular level thickness.

However, that type of miniaturization of thin films requires a fluid controller to perform switching operations at a very high frequency, and such load can cause fluid to leak or the like more easily. Therefore, there is a high demand for technology that can easily detect fluid leakage in a fluid controller.

Further, because highly reactive and extremely toxic gas is used in semiconductor manufacturing processes, it is important to be able to remotely detect leaks while the leaks are small.

On this point, Patent Document 1 discloses a seal portion damage detection mechanism including a hole formed on the outer surface of a controller for controlling the flow rate of fluid and a leak detection member attached to the hole, where the hole communicates with a gap in the controller. The leak detection member includes a cylindrical body attached to the hole and a movable member provided in the cylindrical body, and the movable member is proposed to be movable outward of the cylindrical body by the pressure of the leaked fluid filled in the gap in the controller.

Further, Patent Document 2 discloses a controller with a seal portion damage detection mechanism including a hole formed on the outer surface of the controller for controlling the flow rate of fluid and a leak detection member attached to the hole, where the hole communicates with the space in the controller, and the leak detection member is sensitive to the presence of a specific fluid.

Still further, Patent Document 3 discloses a leak detection device for detecting a fluid leak. It proposed a device including a sensor holding body, an ultrasonic sensor held by the sensor holding body to face a leak port that communicates with the outside, a sealed portion provided in the leak detection target member, an ultrasonic wave path provided between the sensor surface of the ultrasonic sensor and the leak port, and a circuit for processing ultrasonic waves obtained by the ultrasonic sensor.

PRIOR ART REFERENCES

Patent Document

[Patent Document 1] Japanese Patent Application Publication No. 04-093736
[Patent Document 2] Japanese Patent Application Publication No. 05-126669
[Patent Document 3] Japanese Patent Application Publication No. 2014-21029

SUMMARY OF THE INVENTION

Problems to be Solved by the Invention

However, in the seal portion damage detection mechanism described in Patent Document 1, although the pressure of the gap in the controller can be determined but not the negative pressure, and when the leakage of the fluid is slight, there is a possibility that the movable member does not move sufficiently and the leak cannot be detected.

Further, in the controller with a seal portion damage detection mechanism described in Patent Document 2, when fluid leakage is slight, there is a possibility that the leak detection member may not be responsive because of dilution with purge gas, and there is also a possibility that the leakage detection member does not respond to a predetermined fluid.

Furthermore, in the leak detection device described in Patent Document 3, when the leakage of fluid is slight, the ultrasonic wave can be weak and the leakage may not be detected.

In any case, there is room for improvement in the ability to detect minute leaks of fluid.

Therefore, an object of the present invention is to provide a fluid controller capable of detecting a leak even when the leak of the fluid is slight. Another object of the present invention is to make it easy to monitor fluid leakage in a fluid controller at remote locations or a plurality of fluid controllers by utilizing information communication technology.

Means for Solving the Problems

In order to achieve the above object, according to one aspect of the present invention, an anomaly detection device for a fluid controller is a device for detecting an anomaly of the fluid controller having a flow path, a closed space isolated from the flow path by an isolation member, and a leak port communicable between the closed space and an external part, and further having a pressure sensor for detecting a pressure in the closed space, a processing module for executing a predetermined information processing, and a detachable mechanism for fixing detachably the pressure sensor to the leak port and blocking the leak port from the external part in the state of being fixed, where the processing module compares a detection value detected by the pressure sensor to a predetermined threshold, and performs a discrimination process for determining an anomaly of the fluid controller and a communication process for transmitting a discrimination result of the anomaly of the fluid controller to a server.

The anomaly detection device further includes a driving pressure sensor for detecting a driving pressure of the fluid controller, and the processing module can further correct the predetermined threshold in accordance with the detected driving pressure of the fluid controller.

The device further includes an open/close detection mechanism for detecting an open/close operation of the fluid controller, and the processing module can further correct the predetermined threshold in accordance with the detected open/close operation of the fluid controller.

In addition, the device can further include a temperature sensor that measures external temperature, and the processing module can further correct the predetermined threshold according to the measured external temperature.

Further, the communication process executed by the processing module can transmit to the server at a predetermined cycle, a discrimination result of fluid leakage into the closed space.

Further, in the fluid control device in which a plurality of fluid controllers are integrated, the communication process executed by the processing module of the device attached to each fluid controller can transmit to the server, together with self identification information, a discrimination result of fluid leakage at different timings for each device.

Further, the isolation member an be a diaphragm, and the device can have a valve mechanism where the diaphragm abuts to and is separated from a sheet provided in the flow path.

Further, according to another aspect of the present invention, a fluid controller anomaly detection system is a system for detecting an anomaly of a fluid controller including a flow path a closed space isolated from the flow path by an isolation member, and a leak port communicable between the closed space and an external part; the system has an information providing device detachably fixed to the fluid controller, and configured to communicate with a server. The information providing device includes a pressure sensor for detecting pressure in the closed space, a communication module for transmitting a detection value detected by the pressure sensor to the server, and a detachable mechanism for detachably fixing the pressure sensor to the leak port and blocking the leak port from the external part in the state of being fixed, where the server executes a discrimination process for determining an anomaly of the fluid controller by comparing the detection value received from the information providing device to a predetermined threshold value.

Further, according to another aspect of the present invention, a fluid controller anomaly detection method is a method for detecting anomaly of a fluid controller including a flow path, a closed space isolated from the flow path path by an isolation member, and a leak port communicable between the closed space and an external part.

With a device for detachably fixing a pressure sensor to the leak port and blocking the leak port from the external part in the state of being fixed, the method executes a step of detecting pressure of the closed space; a step of determining an anomaly of the fluid controller by comparing a detected value detected by the pressure sensor to a predetermined threshold value; and a step for forwarding a result of the anomaly of the fluid controller to a server.

A fluid controller according to another aspect of the present invention is a fluid controller capable of detecting an anomaly, including a flow path, a closed space isolated from the flow path by an isolation member, a leak port communicable between the closed space and an external part, a pressure sensor for detecting the pressure in the closed space, an detachable mechanism for detachably fixing the pressure sensor to the leak port and blocking the leak port from the external part in the state of being fixed, and a processing module for executing a predetermined information processing. The processing module executes a discrimination process for determining an anomaly of the fluid controller by comparing a detection value detected by the pressure sensor to a predetermined threshold value, and a communication process for transmitting a discrimination result of the anomaly of the fluid controller to a server.

Effect of the Invention

According to the present invention, the fluid controller can detect a leakage even when the leakage of fluid is slight. In addition, coordination with the server has the effect that the fluid leakage can be easily monitored for one or more fluid controllers located at remote locations.

DETAILED DESCRIPTION OF THE INVENTION

Example 1

Figure 1:
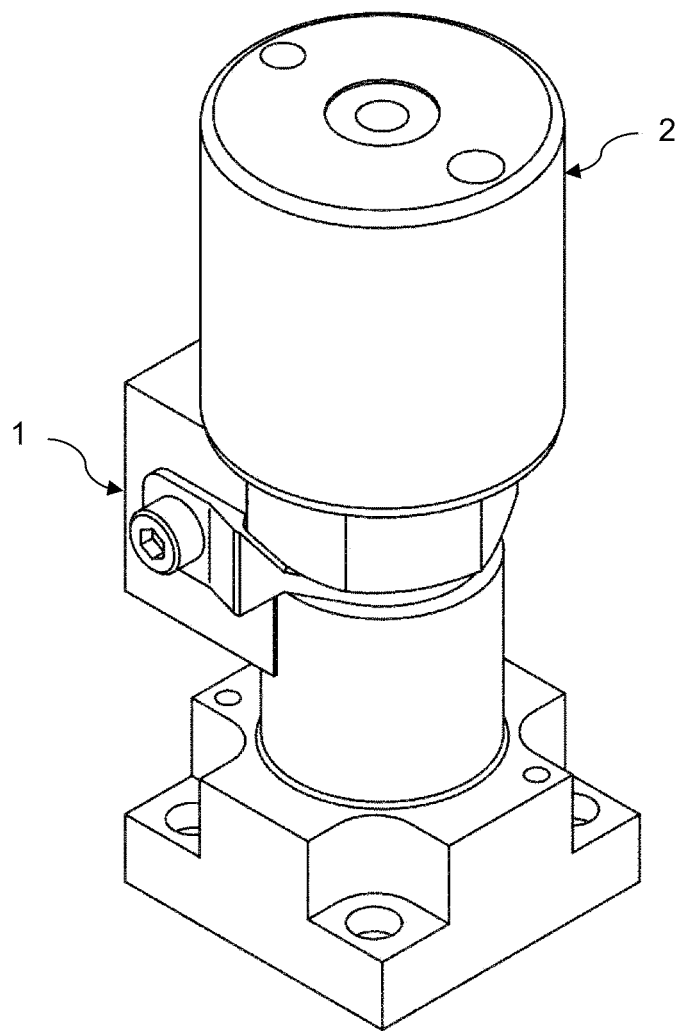
FIG. 1 is an external perspective view showing a fluid controller anomaly detection device attached to a fluid controller, according to a first embodiment of the present invention.

Hereinafter, a fluid controller anomaly detection device according to a first embodiment of the present invention will be described with reference to the drawings.

In the following description, the directions of members and the like can be referred to as upper, lower, left, and right depending on the directions in the drawings for the sake of convenience, but these do not limit the directions of members or the like in practice or use of the present invention.

Figure 2:
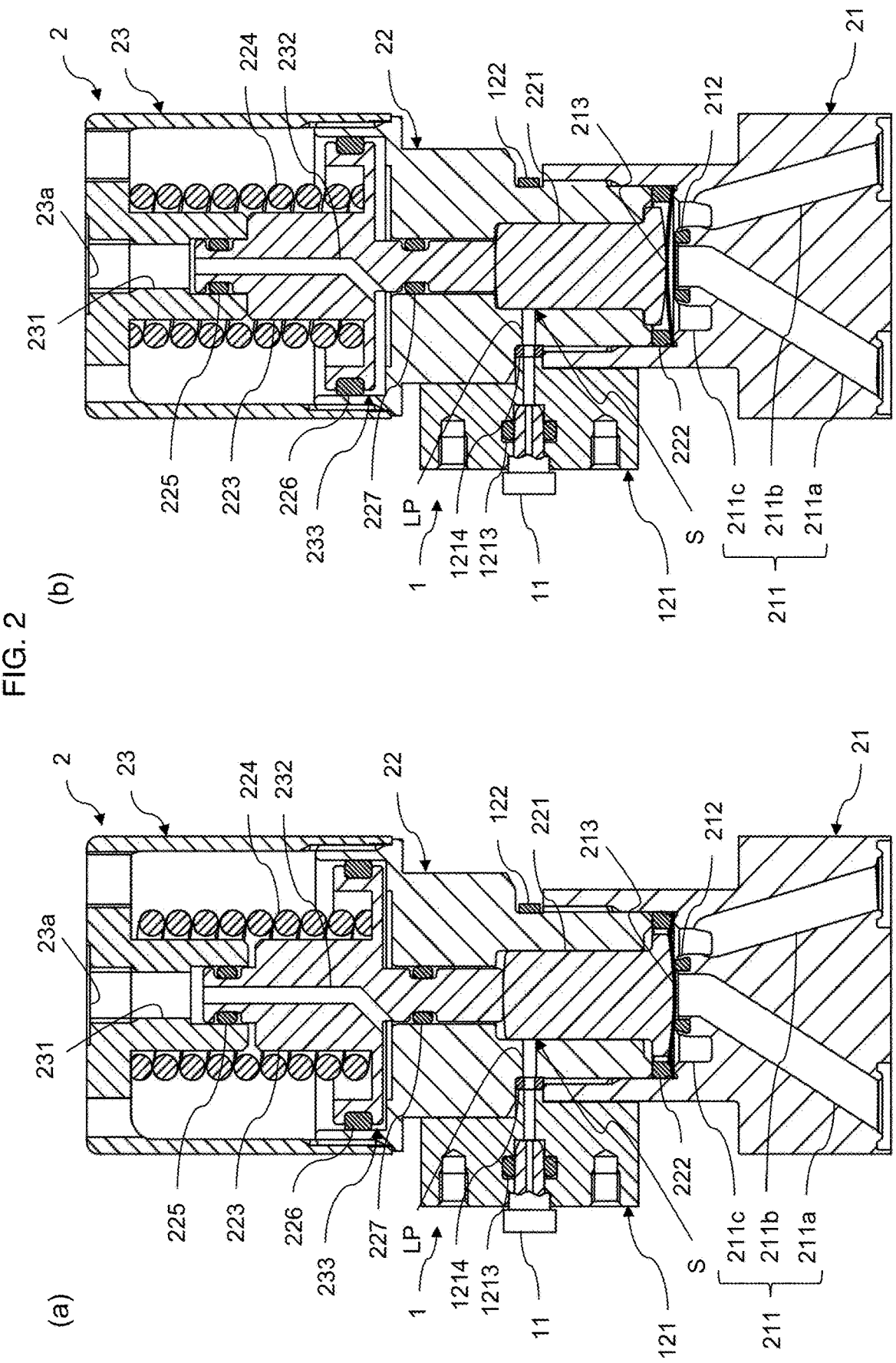
FIG. 2 is a cross-sectional view of a fluid controller anomaly detection device, showing (a) a closed valve state, and (b) an opened valve state.

As shown in FIG. 1 and FIG. 2, an anomaly detection device 1 according to the present embodiment is detachably attached to a fluid controller 2, and detects an anomaly, particularly a leakage of fluid within the fluid controller 2.

Figure 3:
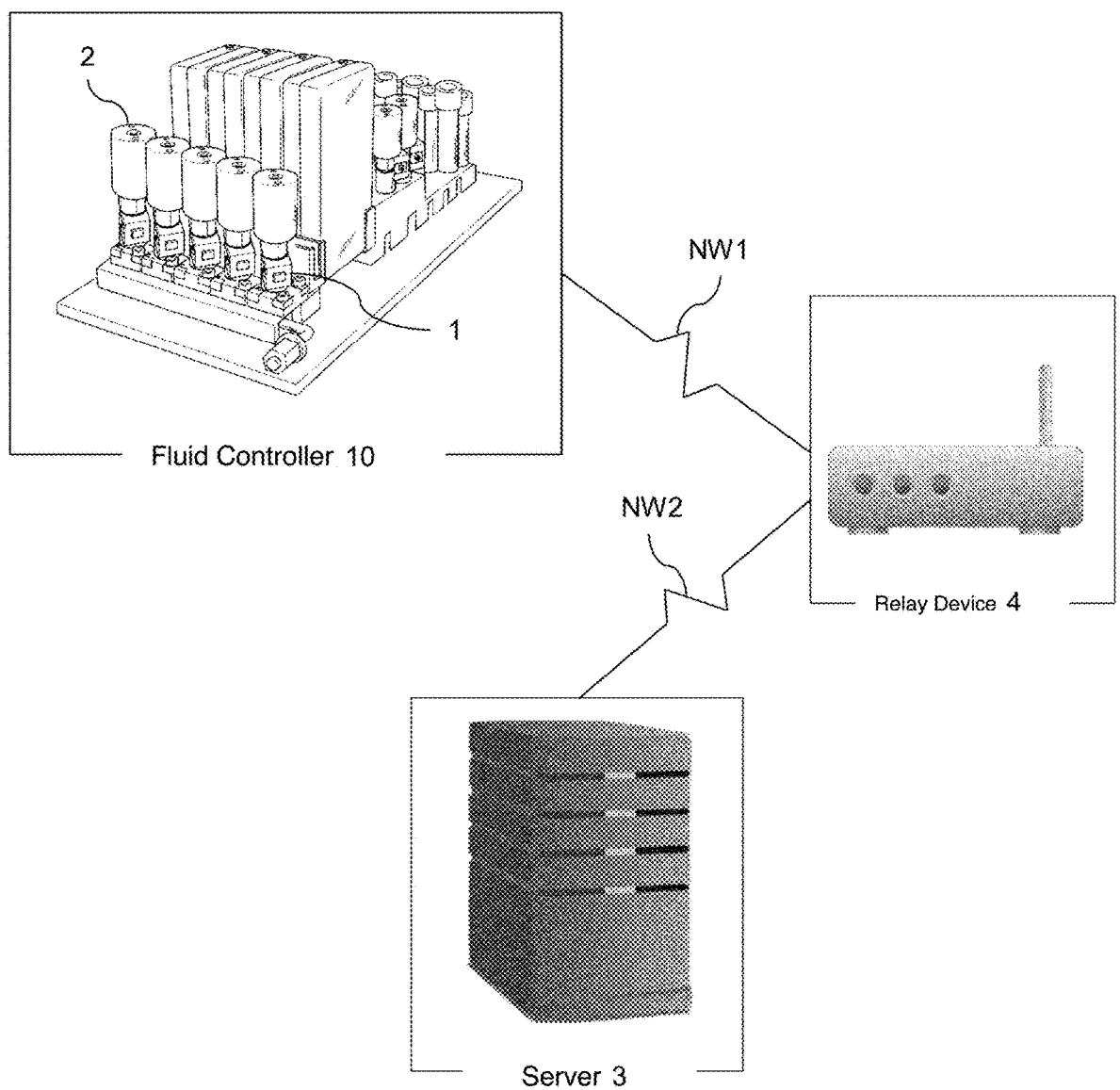
FIG. 3 is a schematic view showing the configuration of a network formed by an anomaly detection device for a fluid controller, according to an embodiment.

Further, as shown in FIG. 3, the anomaly detection device 1 is configured to be able to communicate with a server 3 via networks NW1 and NW2, and provides the server 3 with information on the anomaly of the fluid controller 2. FIG. 3 shows an example in which a plurality of fluid controllers 2 are integrated to constitute a fluid control device 10.

Now, according to the present embodiment, a fluid controller 2 to which the anomaly detection device 1 is applied will be described.

Figure 4:
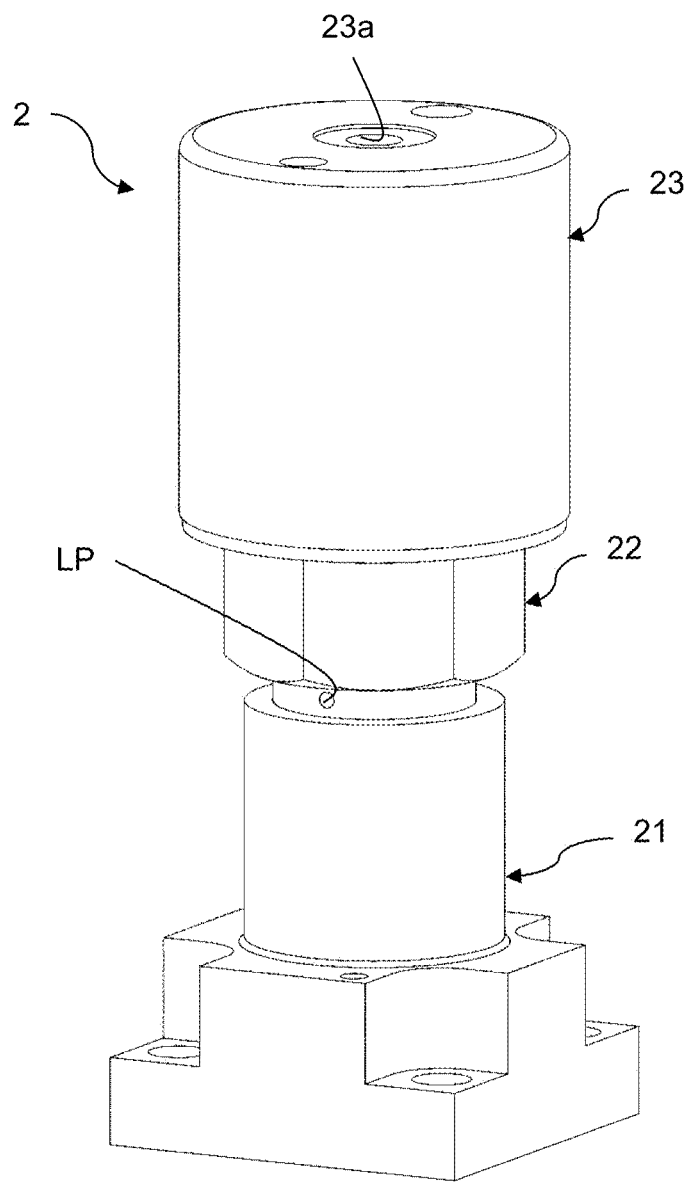
FIG. 4 is an external perspective view showing the fluid controller to which an anomaly detection device for a fluid controller according to a present embodiment is detachably attached.

A direct diaphragm valve is shown in FIG. 4 as the fluid controller 2 to which the anomaly detection device 1 is applied, according to the present embodiment. Externally, the fluid controller 2 includes a valve body 21, a substantially cylindrical actuator body 22 disposed on an upper end of the valve body 21, and an actuator cap 23 attached to an upper end of the actuator body 22.

As shown in FIG. 2, in the valve body 21, there are provided an inflow path 211a into which fluid flows, an outflow path 211b from which the fluid flows out, and a valve chamber 211c communicating with the inflow path 211a and the outflow path 211b. The inflow path 211a, the outflow path 211b, and the valve chamber 211c integrally configure a flow path 211 through which the fluid flows.

Further, an annular sheet 212 is provided at a periphery of a portion where the inflow path 211a and the valve chamber 211c communicate with each other. Further, with regard to the sheet 212, a diaphragm 213 is provided to allow into contact with or separate from the sheet 212 to let the fluid flow from the inflow path 211a to the outflow path 211b and is also provided to block the flow.

The diaphragm 213 is a disk-shaped member made of a metal such as stainless steel or a NiCo-based alloy or a fluorine-based resin, and functions as an isolation member that isolates the flow path 211 and the closed space S. When air as a driving pressure is supplied to the diaphragm 213 and released from the pressing force of a disc 221, the central portion is displaced in a direction in which the central portion separates away from the sheet 212 because of its own restoring force and the pressure in the flow path 211. As a result, the valve chamber 211c is opened, and the inflow path 211a and the outflow path 211b communicate with each other.

On the other hand, when the supply of air as the driving pressure is stopped and the diaphragm 213 is pressed by the disc 221, the central portion of the diaphragm 213 is displaced in the direction of contacting the sheet 212 with respect to the sheet 212 and contacts the sheet 212. As a result, the valve chamber 211c is shut off, and the inflow path 211a and the outflow path 211b are shut off.

In addition, in general, bellows other than the diaphragm 213 of this embodiment can be used as the isolation member. However, while bellows can obtain a large stroke (flow rate range), the volume change in the actuator body becomes large, so it becomes necessary to open up the breathing port (corresponding to a leak port LP in the present example) when opening and closing the fluid controller.

On the other hand, in the direct diaphragm structure as provided in the present example, that is, in the structure in which the fluid is circulated from the inflow path 211a to the outflow path 211b or the flow is interrupted by the diaphragm 213 coming into contact with the sheet 212, there is little volume change in the actuator body 22. For this reason, even when the leak port LP is shut off from the external part by the anomaly detection device 1 of the present example, the fluid controller 2 can perform the open/close operation without any problem. Thus, it can be said that the anomaly detection device 1 of this example is suitable for the fluid controller 2 having a direct diaphragm structure.

In the actuator body 22, a disc 221 for pressing the diaphragm 213, a pressing adapter 222 for pressing the peripheral edge of the diaphragm 213, a piston 223 for causing the diaphragm 213 to abut against the sheet 212 via the disc 221 by sliding up and down, and a spring 224 to bias the piston 223 downward are provided.

The pressing adapter 222 presses the peripheral edge of the diaphragm 213 from above, and prevents the fluid flowing in the flow path 211 from leaking into the actuator body 22 from the vicinity of the peripheral edge of the diaphragm 213.

A small diameter holding portion is provided on an upper end side of a piston 223, and an O-ring 225 is held by the holding portion. The O-ring 225 seals a space between an outer peripheral surface of the piston 223 and an inner peripheral surface of a driving pressure introducing path 231 communicating with a driving pressure inlet 23a of an actuator cap 23. Thus, the air introduced from the driving pressure inlet 23a is introduced into a driving pressure introduction path 232 in the piston 223 without leakage.

A small diameter holding portion is also provided in a middle portion of the piston 223, and an O-ring 226 is held by the holding portion. The O-ring 226 seals a space between an outer peripheral surface of the piston 223 and an inner peripheral surface of the actuator body 22. A space formed by the O-ring 226 and an O-ring 227 forms a driving pressure introduction chamber 233 communicating with the driving pressure introduction path 232 in the piston 223.

Air is introduced into the driving pressure introduction chamber 233 from the driving pressure inlet 23a of the actuator cap 23 through the driving pressure introducing path 231 communicating with the driving pressure inlet 23a and the driving pressure introduction path 232 in the piston 223. When air is introduced into the driving pressure introduction chamber 233, the piston 223 is pushed upward against the biasing force of a spring 224. As a result, the diaphragm 213 is separated from the sheet 212 and opened, and the fluid flows.

On the other hand, when the air is not introduced into the driving pressure introduction chamber 233, the piston 223 is pushed downward according to the biasing force of the spring 224. As a result, the diaphragm 213 abuts against the sheet 212 and is closed, and the flow of fluid is shut off.

A holding portion with a small diameter is also provided on a lower end side of the piston 223, and the O-ring 227 is held by the holding portion. The O-ring 227 seals a space between an outer peripheral surface of the piston 223 and an inner peripheral surface of the actuator body 22. As a result, a closed space S partitioned by the diaphragm 213 and the O-ring 227 is formed at the portion of the actuator body 22 in which the disc 221 moves up and down.

The closed space S communicates with the external part only by the leak port LP provided in the actuator body 22. When the pressure sensor 11 of the anomaly detection device 1 is fixed to the leak port LP, the leak port LP is shut off from the external part and becomes airtight.

Here, the leak port LP provided in the actuator body 22 is configured as a through hole that causes the closed space S to communicate with the external part. The leak port LP is a hole for detecting leakage of fluid into the closed space S because of breakage of the diaphragm 213 or the like, and the anomaly detection device 1 according to the present embodiment is attached to this leak port LP.

When the fluid controller 2 is in normal operation, the leak port LP also functions as a breathing port that enables suction and discharge of air in the actuator body 22 accompanying the vertical movement of the piston 223.

Further, the leak port LP functions as a test port when testing the airtightness of the flow path 211 in the finished product inspection of the fluid controller 2. This finished product inspection is performed by removing the anomaly detection device 1 from the fluid controller 2 and in this state circulating inert helium gas (He) or the like in the flow path 211.

The anomaly detection device 1 according to the present embodiment can be retrofitted to a ready-made or existing fluid controller 2 and can detect leakage of fluid using a leak port LP provided as a breathing port or a test port or the like. Therefore, it is not necessary to provide the fluid controller 2 with a leak port that is dedicated for attaching the anomaly detection device 1 of the present invention.

As shown in FIG. 3, a plurality of fluid controllers 2 configured as described above are integrated to constitute a fluid control device 10. Also in this case, the anomaly detection device 1 is attached to each fluid controller 2 that constitutes the fluid control device 10.

Figure 5:
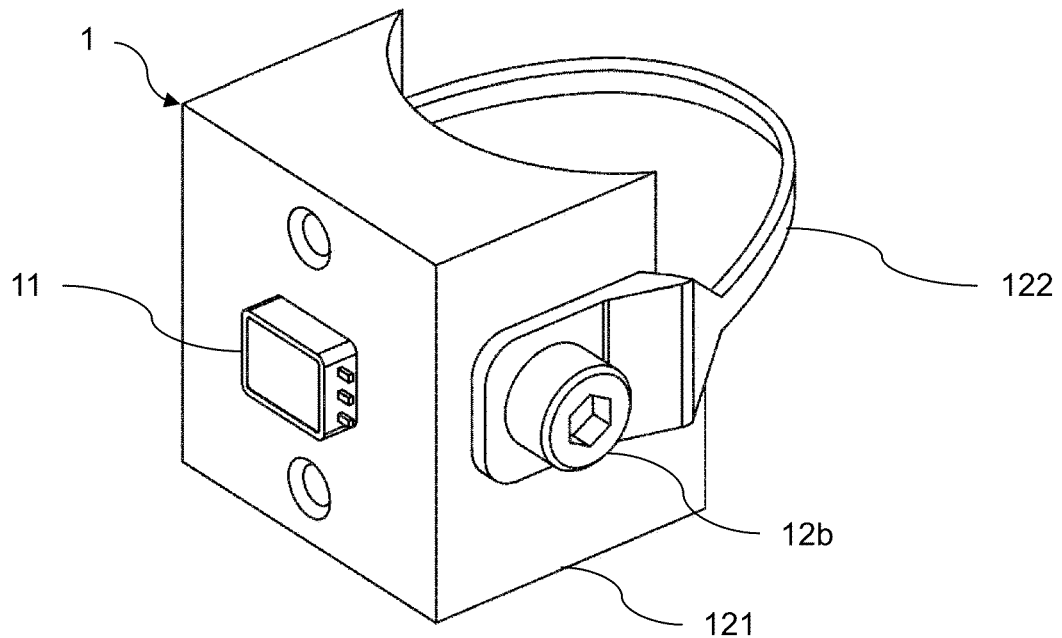
FIG. 5 is an external perspective view of an anomaly detection device for a fluid controller according to a present embodiment, showing (a) the external part, and (b) the side that contacts the fluid controller.
Figure 5:
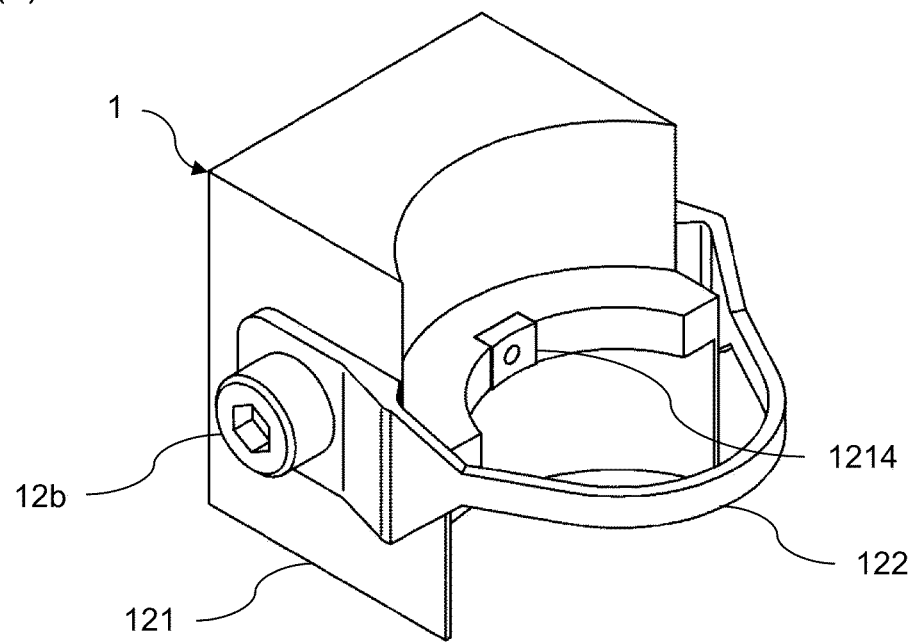
Figure 6:
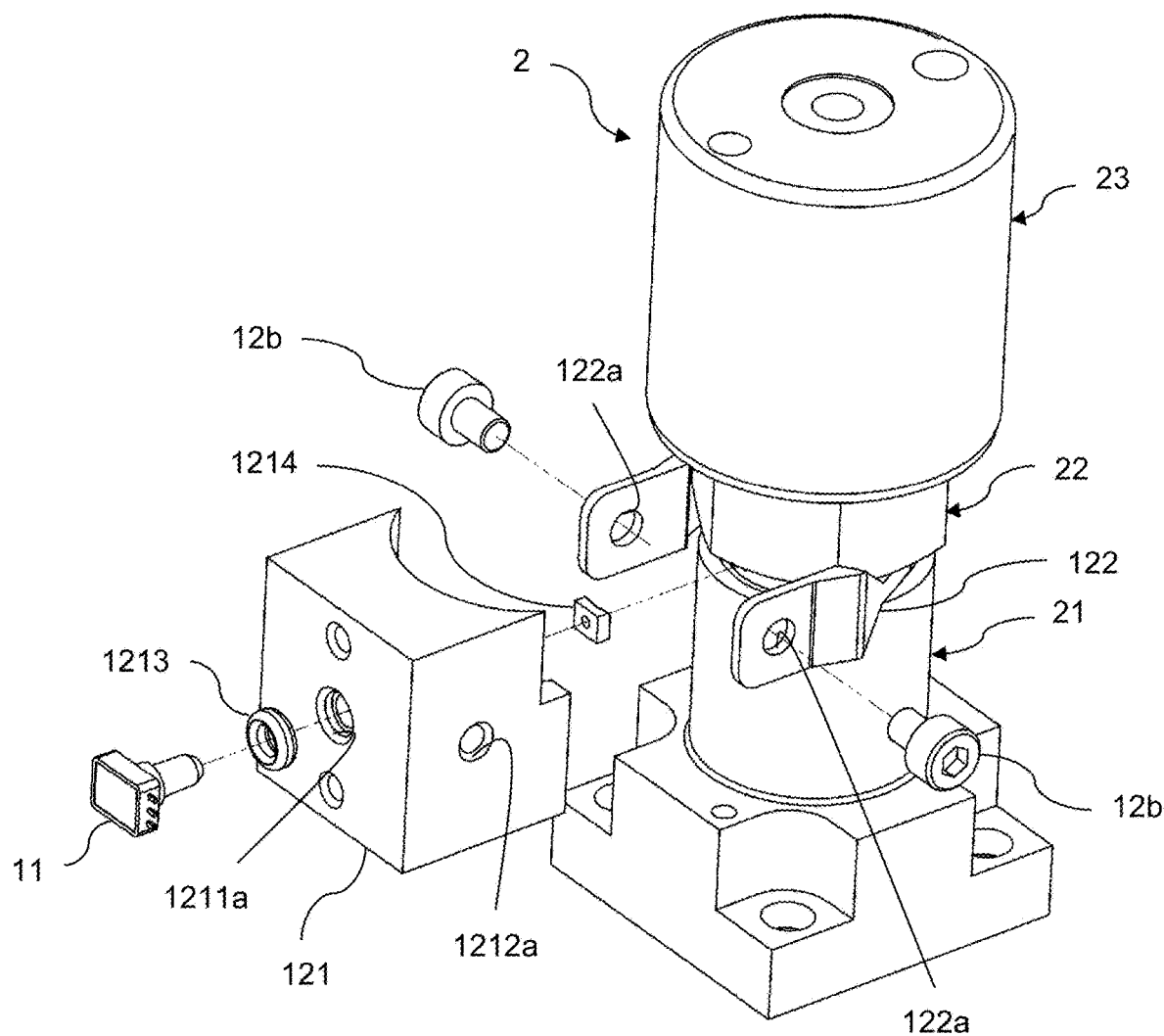
FIG. 6 is an exploded perspective view showing a state when a anomaly detection device for a fluid controller is attached to a fluid controller, according to an embodiment.

The anomaly detection device 1 is a device that detects the pressure in the closed space S, thereby detecting the leakage of the fluid from the flow path 211 to the closed space S, and detects any anomaly in the fluid controller 2 such as breakage of the diaphragm 213. As shown in FIGS. 5 and 6, the anomaly detection device 1 includes a pressure sensor 11, a detachable mechanism 12 configured of a housing 121 and a fixing member 122 (the housing 121 and the fixing member 122 are collectively called the "detachable mechanism 12"), and a processing module 13 (which will be described later with reference to FIG. 7) for executing a predetermined information processing. The processing module 13 can be provided in the housing 121 separately from the pressure sensor 11 or can be configured as a part of the pressure sensor 11.

The pressure sensor 11 detects the pressure in the closed space S of the fluid controller 2 via the leak port LP.

The pressure sensor 11 includes a pressure-sensitive element that detects a pressure change in the closed space S, a conversion element that converts a detected pressure value detected by the pressure-sensitive element into an electrical signal, or the like.

The pressure sensor 11 can detect either a gauge pressure or an atmospheric pressure, and in accordance with each case, a threshold to which the discrimination processing unit 131 (described later with reference to FIG. 7) refers to is set.

Further, in the present embodiment, the pressure sensor 11 detects a pressure change in the closed space S to detect an anomaly in the fluid controller 2 caused by fluid leakage or the like; a condenser type microphone unit can be used as the pressure sensor 11. That is, the condenser type microphone unit has a diaphragm that vibrates upon receiving a sound wave and a counter electrode disposed opposite to the diaphragm, and can convert changes in capacitance between the diaphragm and the counter electrode into changes in voltage and into an audio signal. And this capacitor type microphone unit becomes non-directional (all directions) by closing an air chamber provided on a backside of the diaphragm. In the case of non-directionality, the condenser microphone unit can operate as a pressure sensor because it operates by capturing a change in sound pressure due to the sound waves from all directions.

The detachable mechanism 12 configured by the housing 121 and the fixing member 122 is a mechanism for detachably attaching the anomaly detection device 1 to the fluid controller 2, and detachably fixing the pressure sensor 11 to the leak port LP, and in the state of being fixed, shuts off the leak port LP from the external part.

The housing 121 having a substantially box-like shape has a fitting hole 1211a for holding the pressure sensor 11 on one side, and the pressure sensor 11 is held by fitting the tip of the pressure sensor 11 in the fitting hole 1211a.

The surface of the housing 121 in contact with the fluid controller 2 has a substantially semi-cylindrical cut-out shape to match the shape of the portion where the fluid controller 2 contacts, and at both sides in the width direction of the housing 121, there is a bolt hole 1212a for screwing a bolt 12b thereto for fixing the end of the fixing member 122. In the housing 121, an internal power supply or the like for driving the pressure sensor 11 can be provided as appropriate.

The fixing member 122 is a string-like member made of an elastic material capable of stretching such as elastic metal or rubber, and is the same or slightly shorter than the outer periphery of a portion (in this example, the actuator body 22) around which the fixing member 122 of the fluid controller 2 is wound.

At the ends of the fixing member 122, a pair of bolt holes 122a is formed corresponding to the pair of bolt holes 1212a of the housing 121. By screwing the bolt 12b into the bolt hole 122a of the fixing member 122 and the bolt hole 1212a of the housing 121, both ends of the fixing member 122 are fixed to the side surface of the housing 121, and the fixing member 122 is wound around the fluid controller 2. Thus, the pressure sensor 11 held by the housing 121 is pressed against the leak port LP.

Here, from the state where the anomaly detection device 1 is attached to the fluid controller 2, the anomaly detection device 1 is removed from the fluid controller 2 by loosening the bolt 12b and separating the housing 121 and the fixing member 122, and thereby, this the leak port LP can be opened.

In the present example, an O-ring 1213 seals the space between the pressure sensor 11 and the housing 121. In addition, a seal member 1214 is attached between the pressure sensor 11 and the leak port LP to prevent any fluid that has leaked into the closed space S of the fluid controller 2 from leaking to the external part.

Figure 7:
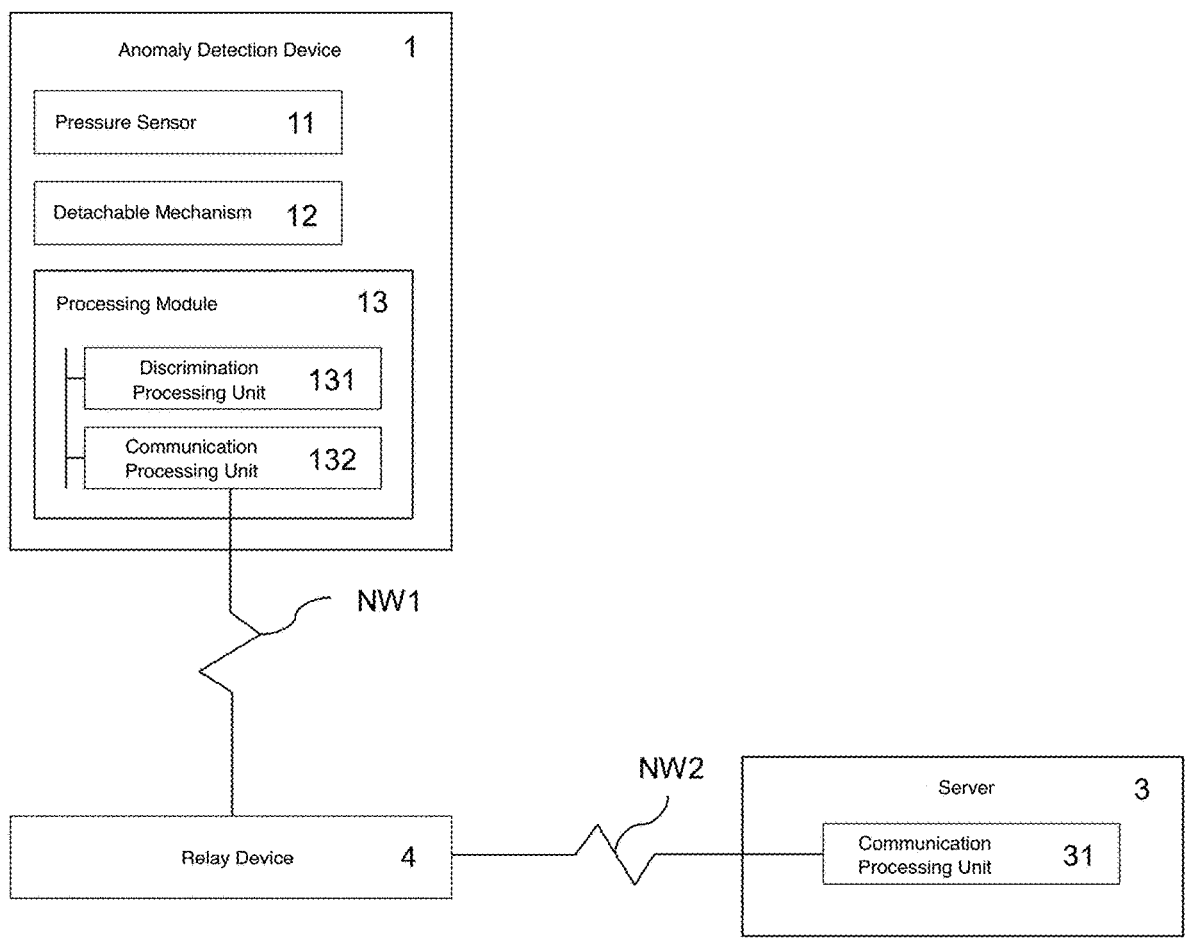
FIG. 7 is a functional block diagram showing functions of an anomaly detection device of a fluid controller and a server configured to be communicable with the anomaly detection device, according to a present embodiment.

The processing module 13 is configured by a CPU (Central Processing Unit) and a memory, and as shown in FIG. 7, includes a functional block having a discrimination processing unit 131 and a communication processing unit 132. The processing module 13 is configured to be able to link with the pressure sensor 11 by a predetermined wiring or the like, and can receive supply of data from the pressure sensor 11.

The discrimination processing unit 131 compares a predetermined threshold value held in the reference table or the like with a detection value of the pressure detected by the pressure sensor 11, thereby executing a process of determining the anomaly of the controller 2 caused by fluid leakage into the closed space S or the like. That is, at the time of normal use, each limit value of the pressure in the closed space S assumed by either opening or closing of the valve of the fluid controller 2 is set as a predetermined threshold value. Then, when the detected value of the pressure in the closed space S goes beyond the threshold, it is determined that an anomaly has occurred on the fluid controller 2. The rationality of such discrimination is that the result of an increase in pressure in the closed space S by the fluid leaking into the closed space S because of breakage of the diaphragm 213 or the like, or the result of a decrease in pressure in the closed space S by the decrease of pressure in the flow path 211, is regarded to have led the detection value of the pressure in the closed space S to go beyond the threshold value.

The communication processing unit 132 is a functional unit for executing a process of transmitting the discrimination result by the discrimination processing unit 131 to the server 3. In the present embodiment, a relay device 4 is provided between the anomaly detection device 1 and the server 3, and the information from the anomaly detection device 1 is provided to the server 3 via the relay device 4.

Specifically, data transmitted by the communication processing unit 132 is once transmitted to the relay device 4 via the network NW1, which is realized by wireless communications such as Bluetooth (registered trademark), infrared communication, or Zigbee (registered trademark), for example. It is transmitted from the relay device 4 to the server 3 via the network NW2, which is realized by a wireless or wired LAN or the like.

Further, the communication processing unit 132 can transmit the discrimination result by the discrimination processing unit 131 at a predetermined cycle set arbitrarily, such as one hour or one day. On this point, it is difficult to detect the moment of a slight leak of fluid, but if it is several days or so, it can be detected because the pressure increases. On the other hand, since the closed space S is an airtight space, it is unlikely that a problem will occur immediately even if a minute leak occurs. Therefore, there is no problem even if transmission is performed according to a predetermined cycle. Furthermore, when information transmission is performed in a predetermined cycle as described above, power consumption can be suppressed.

Further, as shown in FIG. 3, when a plurality of fluid controllers 2 are integrated to constitute the fluid control device 10, the communication processing unit 132 of the anomaly detection device 1 attached to each fluid controller 2 can transmit at different timings, together with the self identification information capable of identifying itself with respect to the server 3, the discrimination result by the discrimination processing unit 131 for each anomaly detection device 1.

Since self-identification information capable of individually identifying the anomaly detection device 1 is transmitted to the server 3, an anomaly occurring in any one of the plurality of fluid controllers 2 constituting the fluid control device 10 can be determined. In addition, by transmitting the discrimination result to the server 3 at different timings for each anomaly detection device 1, it is possible to avoid the problem of packet collision; and compared to a situation where the transmission is made all at once, it is also possible to prevent temporary processing overload. Furthermore, unlike in the case of transmissions made all at once, it is not necessary to change the radio channel used for data transmission for each anomaly detection device 1, and therefore it is not necessary to prepare many channels. In particular, when the network NW1 is configured by Bluetooth (registered trademark), the number of simultaneously connected devices is limited (usually seven), and therefore by changing the transmission timing, the number of anomaly detection devices 1 can exceed the number of simultaneously connected devices.

The server 3 includes hardware resources such as a CPU, a computer program executed by the CPU, a random access memory (RAM) or a read only memory (ROM) for storing computer programs and predetermined data, and an external storage device such as a hard disk drive.

The server 3 includes a communication processing unit 31 for receiving from the anomaly detection device 1 via the relay device 4, the discrimination result of fluid leaking into the closed space S of the fluid controller 2. The information received by the server 3 from the anomaly detection device 1 is appropriately provided to a terminal used by a supervisor or the like in response to a request from a terminal used by a manager or the supervisor of the fluid controller 2 or the like.

The relay device 4 receives data from the anomaly detection device 1 via the network NW1 and transmits the received data to the server 3 via the network NW2.

In the present embodiment, the relay device 4 is interposed between the anomaly detection device 1 and the server 3. However, the anomaly detection device 1 and the server 3 can be configured to be capable of direct data communication.

By attaching the fluid controller 2 to the anomaly detection device 1 having the above configuration, it is possible to detect an anomaly in the fluid controller 2 caused by a leakage to the closed space S or the like based on the comparison of the pressure in the closed space S detected by the pressure sensor 11 to the predetermined threshold value.

Further, since the anomaly detection device 1 is detachably attached to the fluid controller 2, the anomaly detection device 1 can be easily removed as needed, for example, when checking for fluid leakage in the fluid controller 2; and it can also be attached to an off-the-shelf fluid controller 2.

In addition, because information related to an anomaly in the fluid controller 2 is collected in the server 3, a supervisor of the fluid controller 2 can monitor the operating condition of the fluid controller 2 without any burden.

Further, because the fluid controller 2 to which the anomaly detection device 1 is attached is a direct diaphragm valve, the pressure change in the closed space S is small, and even if the anomaly detection device 1 blocks the leak port LP, the operation of the fluid controller 2 would not be hindered.

Furthermore, because the anomaly detection device 1 detects the pressure in the closed space S of the fluid controller 2 and detects an anomaly in the fluid controller 2 by comparing a predetermined threshold value to a detected value, an anomaly of the closed space S is detected, and therefore, even when there is an anomaly where the pressure in the closed space S is negative, this can be detected.

In the above embodiment, when it is determined that there is an anomaly in the fluid controller 2, the anomaly detection device 1 itself can be provided with means for issuing a warning to that effect. Specifically, for example, it can be configured by a visible lamp or the like. This point is the same for other embodiments described later.

Moreover, the structure of the detachable mechanism 12 for detachably attaching the anomaly detection device 1 to the fluid controller 2 is only one example, and if the pressure sensor 11 is addressed to the leak port LP of the fluid controller 2 and it is possible to be fixed detachably thereto, then other structures can be used.

Also, if the space partitioned by the diaphragm 213 and the O-ring 227 is regarded as a closed space S, the anomaly of the fluid controller 2 is detected by detecting the pressure internally thereof. If the space is a sealed space in the fluid controller 2 having the leak port LP and separated by the diaphragm 213, by detecting the pressure of the sealed space as the closed space S, an anomaly in the fluid controller 2 such as breakage of the diaphragm 213 can be detected.

Second Embodiment

Next, a fluid controller anomaly detection device according to a second embodiment of the present invention will be described.

Figure 8:
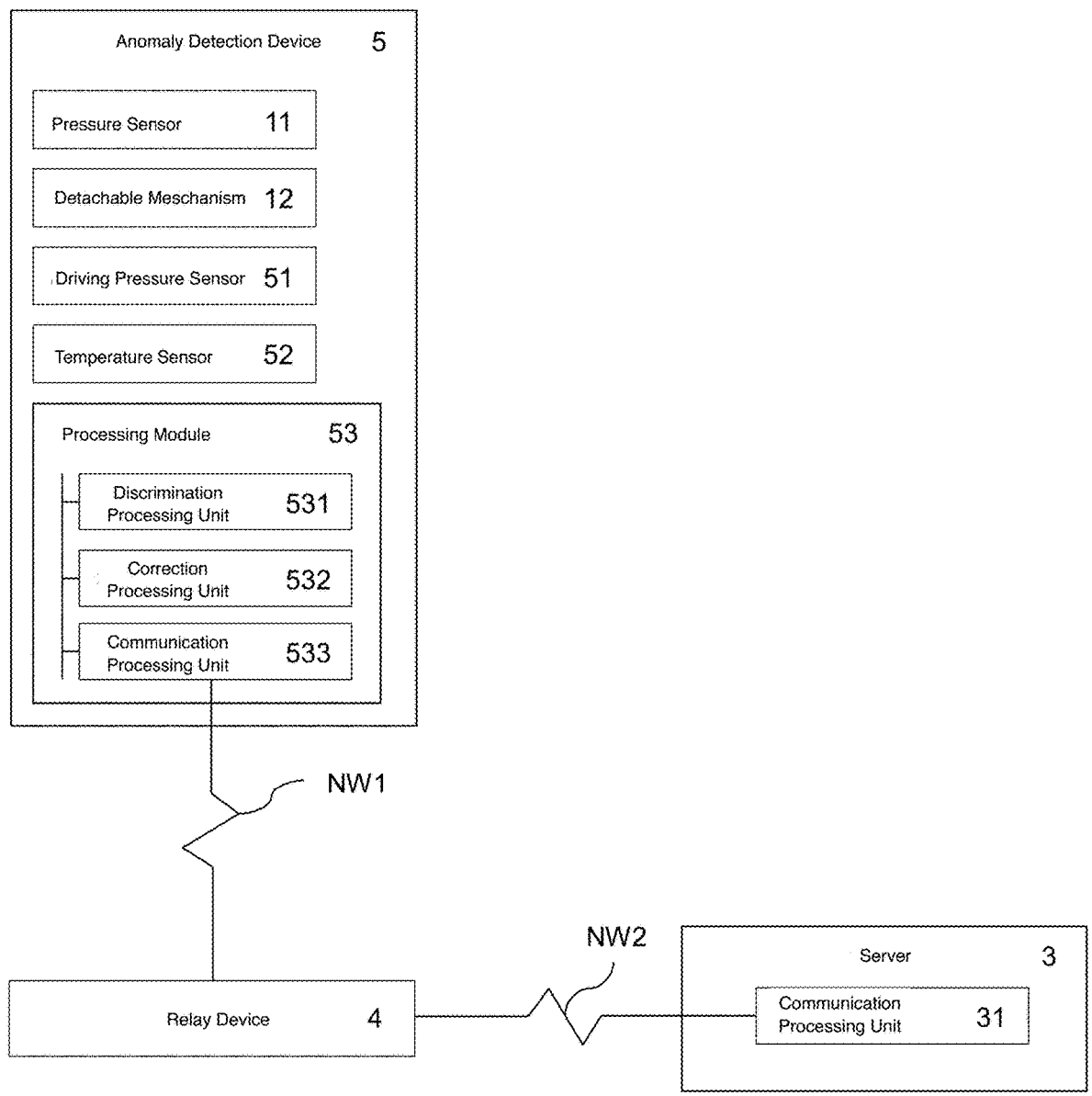
FIG. 8 is a functional block diagram showing functions of an anomaly detection device for a fluid controller and a server configured to be communicable with the anomaly detection device, according to a second embodiment of the present invention.

As shown in FIG. 8, in addition to the pressure sensor 11 and the detachable mechanism 12 provided in the anomaly detection device 1 according to the first embodiment described above, the anomaly detection device 5 according to the present embodiment has a driving pressure sensor 51 for detecting a driving pressure of the fluid controller 2, and a temperature sensor 52 for measuring the external temperature. Further, a processing module 53 included in the anomaly detection device 5 according to the present embodiment configures a functional block including a discrimination processing unit 531, a correction processing unit 532, and a communication processing unit 533.

The processing module 53, as in the first embodiment described above, is provided in the housing 121, which is configured by, for example, the detachable mechanism 12 and the pressure sensor 11. Further, the processing module 53 in the present embodiment is configured to be able to link to such as the driving pressure sensor 51 and the temperature sensor 52 by a predetermined housing, wiring, etc., and is able to receive the supply of data from the driving pressure sensor 51 and the temperature sensor 52.

Further, the function and structure of the fluid controller 2 to which the anomaly detection device 5 according to the present embodiment is detachably attached are the same as those in the first embodiment described above. Further, the function of the anomaly detection device 5 according to the present embodiment transmitting the discrimination result by the discrimination processing unit 531 to the server 3, which is configured to be able to communicate by relaying the relay device 4 in accordance with the networks NW1 and NW2, is also the same as the above-described first embodiment. Moreover, unless otherwise specified, in the description of the present embodiment, because elements and functional parts having the same reference numerals (symbols) as the first embodiment retain the same functions or execute the same processes as the elements or functional parts described above, their description will be omitted.

The driving pressure sensor 51 detects the driving pressure of the fluid controller 2. The driving pressure sensor 51 is attached to, for example, the driving pressure inlet 23a of the fluid controller 2 and detects the pressure of air as the driving pressure introduced into the fluid controller 2. Information regarding the detected air pressure is supplied to a correction processing unit 532.

The temperature sensor 52 measures the external temperature in the environment where the fluid controller 2 is installed. Information regarding the measured external temperature is supplied to the correction processing unit 532.

As in the discrimination processing unit 131 in the first embodiment, the discrimination processing unit 531 compares the predetermined threshold value held in the reference table or the like to the detection value of the pressure detected by the pressure sensor 11, such that a process is performed to determine whether the fluid controller 2 is abnormal because of fluid leakage to the closed space S or the like. On the other hand, in the present embodiment, the predetermined threshold value is corrected by the correction processing unit 532, and when the correction is made, the discrimination processing unit 531, by comparing the corrected threshold value with the detected value of the pressure detected by the pressure sensor 11, executes a process of determining an anomaly of the fluid controller 2 caused by leakage of fluid into the closed space S or the like.

The correction processing unit 532, in accordance with the pressure of the air detected by the drive pressure sensor 51 and the external temperature measured by the temperature sensor 52, corrects the predetermined threshold which is referenced by the discrimination processing unit 531 to determine the leakage of the fluid into the closed space S.

That is, when the air pressure for opening and closing the fluid controller 2 is changed, the pressure in the closed space S changes because of the vertical movement of the piston 223. For that reason, the correction processing unit 532 corrects the predetermined threshold so that the discrimination processing unit 531 can distinguish the change in pressure in the closed space S because of the air pressure from the change in pressure in the closed space S caused by the anomaly of the fluid controller 2, and thereby discriminate the anomaly of the fluid controller 2. Specifically, when air is introduced, the pressure in the closed space S decreases, so the threshold value is corrected to a low value, and when air is discharged, the pressure in the closed space S rises, so the threshold value is corrected to a higher value. As a result, the discrimination processing unit 531 can discern the changes in the pressure in the closed space S caused by an anomaly in the fluid controller 2 such as fluid leakage, without regard to the pressure change in the closed space S that accompanies the pressure change by air.

Here, because the driving pressure sensor 51 is used, it is possible to determine a pressure change in the closed space S caused by fluid leakage or the like even during the opening/closing operation of the fluid controller 2. That is, it is possible to correct the transient pressure change in the closed space S at the moment when the piston 223 is moving by experimentally obtaining an appropriate transfer function that converts the driving pressure into a necessary correction value.

At the same time, in the case the detected value of the pressure sensor 11 does not increase even though the pressure increase in the closed space S is expected from the detected value of the driving pressure sensor 51, discrimination can be made for a failure of the piston 223 or the pressure sensor 11.

In addition, the pressure in the closed space S also changes depending on the external temperature. For that reason, the correction processing unit 532 corrects the predetermined threshold so that the discrimination processing unit 531 can distinguish the change in pressure in the closed space S because of the external temperature from the change in pressure in the closed space S caused by the anomaly of the fluid controller 2, and therefore, can discriminate the anomaly of the fluid controller 2. Specifically, the threshold value is corrected to a high value according to the rise of the external temperature, and the threshold value is corrected to a low value according to the fall of the external temperature. As a result, the discrimination processing unit 531 can discern the changes in the pressure in the closed space S caused by the anomaly of the fluid controller 2 such as the leakage of the fluid without regard to the pressure change in the closed space S that accompanies the external temperature change.

Similar to the communication processing unit 132 in the first embodiment described above, the communication processing unit 533 is a functional unit for executing a process of transmitting the discrimination result by the discrimination processing unit 531. Also in the present embodiment, the relay device 4 is provided between the anomaly detection device 5 and the server 3, and information is provided from the anomaly detection device 5 to the server 3 via the relay device 4.

The communication means and method of the communication processing unit 533 and the configurations of the networks NW1 and NW2 are the same as those in the first embodiment described above. Similarly, data transmission can be performed in a predetermined cycle also in this embodiment.

According to the anomaly detection device 5 according to the present embodiment having the above configuration, even if the pressure in the closed space S changes because of the air as the driving pressure or the external temperature, this change and a change in pressure in the closed space S caused by an anomaly in the controller 2 such as by fluid leakage can be distinguished, and the anomaly in the fluid controller 2 can be detected.

As a modification of the present embodiment, instead of the driving pressure sensor 51 for detecting the driving pressure of the fluid controller 2, there can be provided an open/close detection mechanism for detecting an opening/closing operation by a switch operation or the like of the fluid controller 2.

That is, the pressure of the air as the driving pressure is changed by the opening/closing operation of the fluid controller 2, and this causes a pressure change in the closed space S. Therefore, also with respect to detecting the opening/closing operation of the fluid controller 2, by causing the correction processing unit 532 to correct the predetermined threshold, the change of the pressure in the closed space S because of the opening/closing of the fluid controller 2 and the change in pressure in the closed space S caused by the anomaly of fluid controller 2 can be distinguished, and the anomaly of the fluid controller 2 can be determined.

Example 3

A fluid controller anomaly detection system according to a third embodiment of the present invention will be described.

Figure 9:
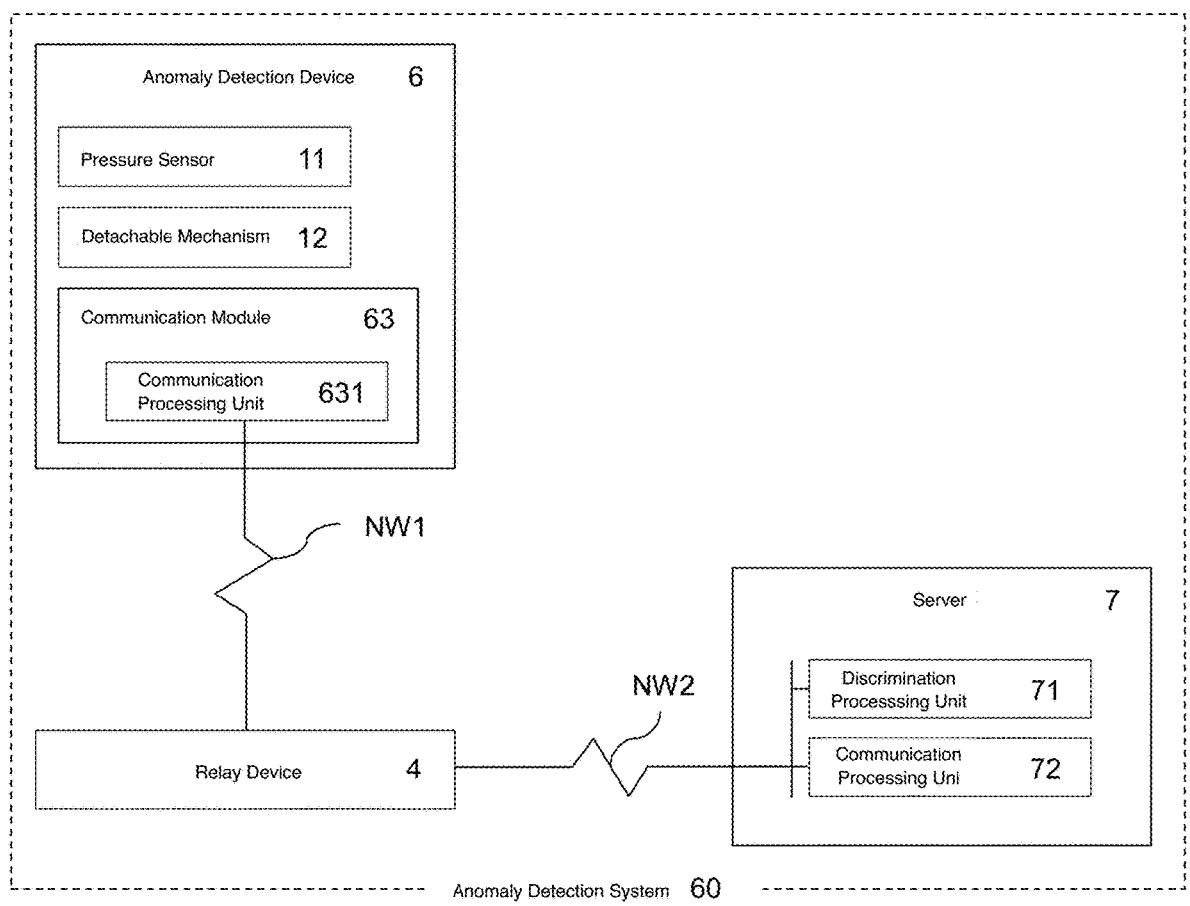
FIG. 9 is a functional block diagram showing functions of an anomaly detection system for a fluid controller, according to a third embodiment of the present invention.

As shown in FIG. 9, an anomaly detection system 60 according to the present embodiment includes an information providing device 6, a relay device 4, and a server 7. In the anomaly detection system 60, the server 7 includes the same functional units as the discrimination processing unit 131 included in the anomaly detection device 1 according to the first embodiment described above, and an anomaly in the fluid controller 2 caused by fluid leakage or the like is determined on the side of the server 7.

The information providing device 6 according to the present embodiment includes the pressure sensor 11 and the detachable mechanism 12 similar to the anomaly detection device 1 according to the first embodiment described above, but in place of the processing module 13, a communication module 63 executes only data communication.

As in the processing module 13 of the first embodiment described above, the communication module 63 provided in the housing 121 constituting the pressure sensor 11 and the detachable mechanism 12 or the like, is configured to be linkable to the pressure sensor 11 by a predetermined wiring or the like, and is made to be supplied with data from the pressure sensor 11.

Then, the communication processing unit 631 included in the communication module 63 executes a process of transmitting the detection value of the pressure in the closed space S detected by the pressure sensor 11 to the server 7.

Also in the present embodiment, the relay device 4 is provided between the information providing device 6 and the server 7, and the information providing device 6 provides information to the server 7 through the relay device 4. The communication means and method by the communication processing unit 631 and the configurations of the networks NW1 and NW2 are the same as in the first embodiment described above. Similarly, data transmission can be performed in a predetermined cycle also in this embodiment. Further, the function and structure of the fluid controller 2 to which the information providing device 6 of this embodiment is attached detachably, are the same as those of above-mentioned first embodiment. Moreover, in the description of the present embodiment, unless otherwise specified, members and functional parts having the same reference numerals (symbols) as the first embodiment retain the same functions or perform the same processes, as the above-described members and functional parts, and therefore, their description will be omitted.

The server 7 is constituted by a CPU, a computer program executed by the CPU, a RAM or ROM storing a computer program and predetermined data, and hardware resources such as an external storage device such as a hard disk drive, and is configured with a functional unit including a discrimination processing unit 71 and a communication processing unit 72.

By comparing the predetermined threshold value held in the reference table or the like to the detection value of the pressure detected by the pressure sensor 11 as in the discrimination processing unit 131 in the first embodiment, the discrimination processing unit 71 performs a process to determine whether the fluid controller 2 is abnormal because of fluid leakage to the closed space S or the like. Here, in the present embodiment, the detection value of the pressure detected by the pressure sensor 11 is acquired by the communication processing unit 72 via the networks NW1 and NW2.

The communication processing unit 72 receives the information related to the detected value of the pressure in the closed space S from the information providing device 6 via the relay device 4.

In the present embodiment, the discrimination of an anomaly of the fluid controller 2 caused by fluid leakage or the like is performed on the side of the server 7, but in the same manner as in the first embodiment, the discrimination result of the anomaly of the fluid controller 2 discriminated by the server 7 is appropriately provided to a terminal used by a supervisor or the like in response to a request from the terminal used by the supervisor or the like of the fluid controller 2.

Also with the configuration of the anomaly detection system 60 according to the present embodiment described above, as in the first embodiment, it is possible to detect an anomaly in the fluid controller 2 caused by fluid leakage or the like in the fluid controller 2. Further, according to the present embodiment, as a result of the anomaly discrimination processing of the fluid controller 2 being executed on the side of the server 7, the configuration of the information providing device 6 attached to the fluid controller 2 can be simplified, and maintenance such as debugging of a program executed by the discrimination processing unit 71 is also facilitated.

Example 4

A fluid controller anomaly detection system according to a fourth embodiment of the present invention will be described.

Figure 10:
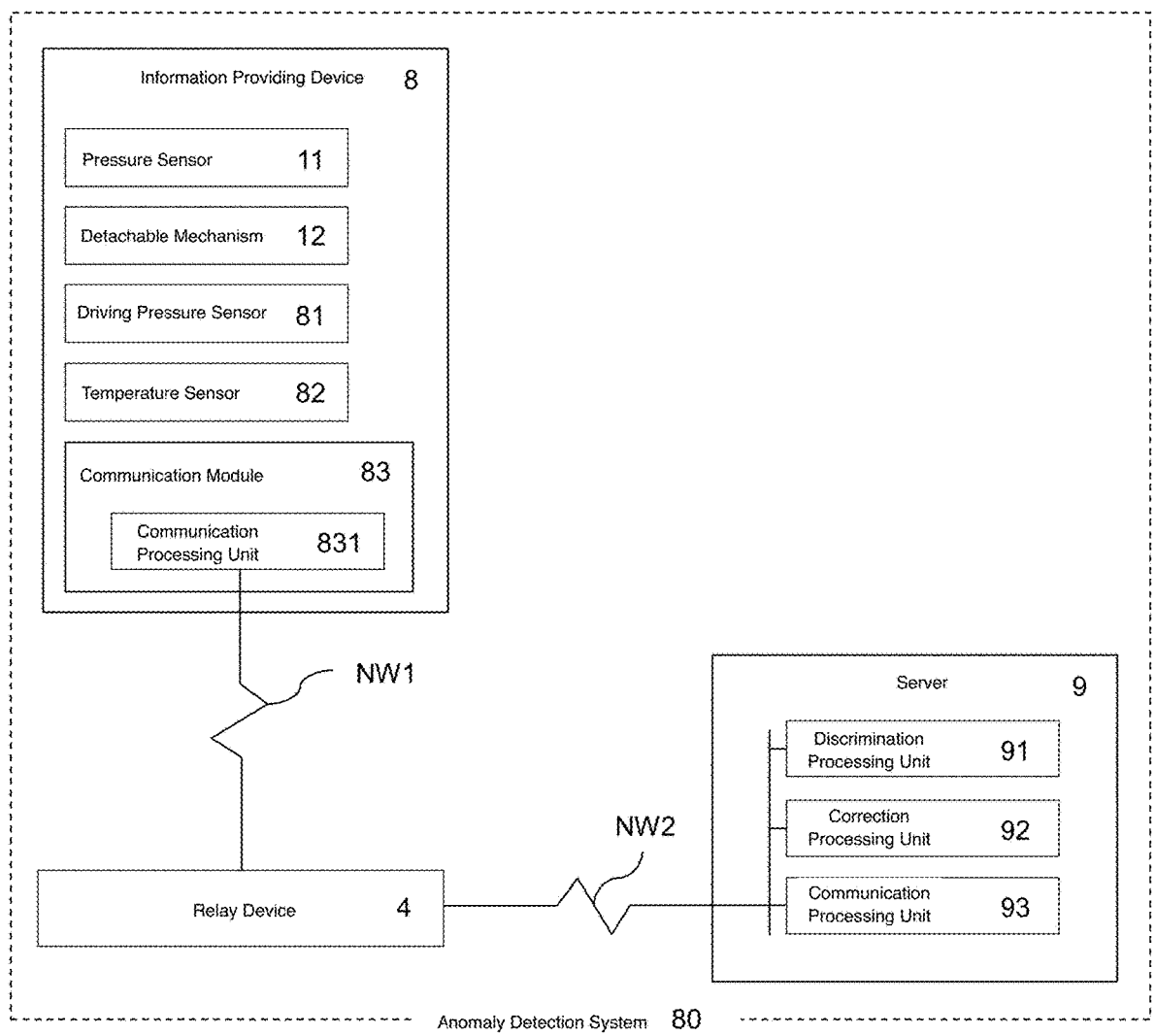
FIG. 10 is a functional block diagram showing functions of an anomaly detection system for a fluid controller, according to a fourth embodiment of the present invention.

As shown in FIG. 10, an anomaly detection system 80 according to the present embodiment includes an information providing device 8, a relay device 4, and a server 9, as in the anomaly detection system 60 according to the third embodiment described above. On the other hand, the information providing device 8 includes a driving pressure sensor 81 and a temperature sensor 82, and the server 9 includes a correction processing unit 92.

The driving pressure sensor 81 and the temperature sensor 82 have the same configuration and function as the driving pressure sensor 51 and the temperature sensor 52 in the second embodiment described above, and detect respectively the driving pressure and the external temperature.

Similarly to the processing module 13 of the first embodiment described above, the communication module 83 is provided inside the housing 121 that constitutes the pressure sensor 11 and the detachable mechanism 12, and is capable of being linked, by predetermined wiring and the like, the driving pressure sensor 81 and the temperature sensor 82 in addition to the pressure sensor 11. The information regarding the detected pressure value in the closed space S, the driving pressure, and the external temperature—detected by the pressure sensor 11, the driving pressure sensor 81, and the temperature sensor 82—is relayed to the server 9 via the relay device 4 by the communication processing unit 831 that is provided in the communication module 83.

Also in the present embodiment, the relay device 4 is provided between the information providing device 8 and the server 9, and the information providing device 8 provides information to the server 9 via the relay device 4. The communication means and method of the communication processing unit 831 and the configurations of the networks NW1 and NW2 are the same as in the first embodiment described above. Similarly, data transmission can be performed in a predetermined cycle also in this embodiment.

Moreover, the function and structure of the fluid controller 2 to which the information providing device 8 of this embodiment is attached detachably, are the same as those of above-mentioned first embodiment. Moreover, in the description of the present embodiment, unless otherwise specified, because members and functional parts having the same reference numerals (symbols) as the first embodiment retain the same functions or perform the same processes as the above-described members and functional parts, their description will be omitted.

The server 9 is composed of a CPU, a computer program executed by the CPU, a RAM or ROM for storing a computer program and predetermined data, and hardware resources such as an external storage device, for example, a hard disk drive, and has a functional unit configured to include a discrimination processing unit 91, a correction processing unit 92, and a communication processing unit 93.

Similar to the discrimination processing unit 531 in the second embodiment, by comparing the predetermined threshold value to the detection value of the pressure detected by the pressure sensor 11, the discrimination processing unit 91 not only determines the anomaly of the fluid controller 2 caused by fluid leakage into the closed space S and the like but also, when a predetermined threshold that serves as a reference for the discrimination processing of an anomaly in the fluid controller 2 is corrected by the correction processing unit 92, executes a process of determining the anomaly in the fluid controller 2 caused by the anomaly using the corrected threshold as a reference.

As with the correction processing unit 532 in the second embodiment, the correction processing unit 92 corrects a predetermined threshold referred to by the discrimination processing unit 91 in order to determine an anomaly of the controller 2, in accordance with the pressure of air detected by the driving pressure sensor 81 and the external temperature measured by the temperature sensor 82. However, in the present embodiment, unlike the second embodiment, the information related to the pressure of the air and the external temperature is supplied from the information providing device 8 to the server 9 via the networks NW1 and NW2.

The communication processing unit 93 receives information related to the detected pressure value in the closed space S by the pressure sensor 11, the drive pressure by the drive pressure sensor 81, and the external temperature by the temperature sensor 82, from the information providing device 8 via the relay device 4.

Also by the anomaly detection system 80 according to the present embodiment having the above configuration, as in the second embodiment, even when the pressure in the closed space S changes because of the air as the driving pressure or the external temperature, this change and a change in pressure in the closed space S because of fluid leakage can be distinguished, and an anomaly in the fluid controller 2 caused by the leakage of fluid into the closed space S can be detected. Further, according to the present embodiment, as a result of the anomaly discrimination processing of the fluid controller 2 being executed on the side of the server 9, the configuration of the information providing device 8 attached to the fluid controller 2 can be simplified, and maintenance such as debugging of programs executed by the discrimination processing unit 91 and the correction processing unit 92 is also facilitated.

Also in the present embodiment, in place of the driving pressure sensor 81 for detecting the driving pressure of the fluid controller 2, a modification is provided in which an open/close detection mechanism for detecting the opening/closing operation by a switch operation of the fluid controller 2 is provided. In this case, when the opening/closing operation of the fluid controller 2 is detected by the open/close detection mechanism, such information is supplied to the correction processing unit 92 via the networks NW1 and NW2. In response to this, when the predetermined threshold value is corrected by the correction processing unit 92, the change of the pressure in the closed space S because of the opening and closing of the fluid controller 2 and the change of the pressure of the closed space S caused by the anomaly of the fluid controller 2 can be distinguished, and the anomaly of the fluid controller 2 can be determined.

In the above embodiments, although the anomaly detection devices 1 and 5 or the information providing device, 6, 8 and the fluid controller 2 are separately provided, the embodiments are not limited to these, and the anomaly detection devices 1 and 5 or the information providing device 6, 8 and the fluid controller 2 can be configured to be integrated together as a fluid controller.

EXPLANATION OF CODE 1, 5 anomaly detection device
11 pressure sensor
12 detachable mechanism
121 housing
122 fixing member
13, 53 processing modules
131, 531 discrimination processing unit
132, 533 communication processing unit
51, 81 driving pressure sensor
52, 82 temperature sensor
532 correction processing unit
2 fluid controller
21 valve body
211a inflow path
211b outflow path
211c valve chamber
212 sheet 213 diaphragm
22 actuator body
221 disc
222 pressing adapter
223 piston
224 spring
23 actuator cap
23a driving pressure inlet
231, 232 driving pressure introduction path
233 driving pressure introduction chamber
LP leak port
S closed space
3, 7 and 9 server
31, 72, 93 communication processing unit
71, 91 discrimination processing unit
92 correction processing unit
4 relay device
6, 8 information providing device
63, 83 communication module
631, 831 communication processing unit
NW1, NW2 network

What is claimed is:

1. An anomaly detection device for a fluid controller for detecting an anomaly of the fluid controller, comprising:
a flow path;
a closed space isolated from the flow path by an isolation member;
a leak port communicable between the closed space and an external part;
a pressure sensor for detecting a pressure in the closed space;
a driving pressure sensor for detecting a driving pressure of the fluid controller;
a processing module for executing a predetermined information processing; and
a detachable mechanism for detachably fixing the pressure sensor to the leak port and, blocking the leak port from the external part in the state of being fixed,
wherein the processing module is configured to compare a detection value detected by the pressure sensor to a predetermined threshold and to perform a discrimination process for determining an anomaly of the fluid controller, a correction process for correcting the predetermined threshold in accordance with the driving pressure of the fluid controller detected by the driving pressure sensor, and a communication process for transmitting a discrimination result of the anomaly of the fluid controller to a server.

2. The anomaly detection device according to claim 1, further comprising: a temperature sensor that measures external temperature, and the processing module further corrects the predetermined threshold according to the measured external temperature.

3. The anomaly detection device according to claim 2, wherein the communication process executed by the processing module transmits to the server at a predetermined cycle, a discrimination result of fluid leakage into the closed space.

4. The anomaly detection device according to claim 3, wherein in the fluid control device in which a plurality of fluid controllers are integrated, the communication process executed by the processing module of the device attached to each fluid controller transmits to the server, together with self identification information, the discrimination result of fluid leakage at different timings for each device.

5. The anomaly detection device according to claim 1, wherein the communication process executed by the processing module transmits to the server at a predetermined cycle, a discrimination result of fluid leakage into the closed space.

6. The anomaly detection device according to claim 5, wherein in the fluid control device in which a plurality of fluid controllers are integrated, the communication process executed by the processing module of the device attached to each fluid controller transmits to the server, together with self identification information, the discrimination result of fluid leakage at different timings for each device.

7. The anomaly detection device according to claim 1, wherein the isolation member is a diaphragm, and the device has a valve mechanism where the diaphragm abuts to and is separated from a sheet provided in the flow path.

8. An anomaly detection device for a fluid controller for detecting an anomaly of the fluid controller, comprising:
a flow path;
a closed space isolated from the flow path by an isolation member;
a leak port communicable between the closed space and an external part;
a pressure sensor for detecting a pressure in the closed space;
an open/close detection mechanism for detecting an open/close operation of the fluid controller;
a processing module for executing a predetermined information processing; and
a detachable mechanism for detachably fixing the pressure sensor to the leak port and, blocking the leak port from the external part in the state of being fixed,
wherein the processing module is configured to compare a detection value detected by the pressure sensor to a predetermined threshold and to perform a discrimination process for determining an anomaly of the fluid controller, a correction process for correcting the predetermined threshold in accordance with the detected open/close operation of the fluid controller, and a communication process for transmitting a discrimination result of the anomaly of the fluid controller to a server.

9. The anomaly detection device according to claim 8, wherein the communication process executed by the processing module transmits to the server at a predetermined cycle, a discrimination result of fluid leakage into the closed space.

10. The anomaly detection device according to claim 9, wherein in the fluid control device in which a plurality of fluid controllers are integrated, the communication process executed by the processing module of the device attached to each fluid controller transmits to the server, together with self identification information, the discrimination result of fluid leakage at different timings for each device.

11. A fluid controller anomaly control system, comprising:
a fluid controller including a flow path;
a closed space isolated from the flow path by an isolation member;
a leak port capable of communicating the closed space to an external part; and
an information providing device detachably fixed to the fluid controller, configured to communicate with a server,
wherein the information providing device comprises a pressure sensor for detecting pressure in the closed space; a driving pressure sensor for detecting a driving pressure of the fluid controller; a communication module for transmitting a detection value detected by the pressure sensor and the driving pressure of the fluid controller detected by the driving pressure sensor to the server; and a detachable mechanism for detachably fixing the pressure sensor to the leak port and blocking the leak port from the external part in the state of being fixed, and wherein the server is configured to execute a discrimination process for determining an anomaly of the fluid controller by comparing the detection value received from the information providing device to a predetermined threshold value, and a correction process for correcting the predetermined threshold value in accordance with the driving pressure of the fluid controller detected by the driving pressure sensor.

12. A fluid controller anomaly detection method for detecting anomaly of a fluid controller comprising a flow path; a closed space isolated from the flow path by an isolation member; a leak port capable of communicating the closed space to an external part; with a device for detachably fixing a pressure sensor to the leak port and blocking the leak port from the external part in the state of being fixed, comprising:

a step of detecting pressure of the closed space;
a step of detecting a driving pressure of the fluid controller by a driving pressure sensor;
a step of determining an anomaly of the fluid controller by comparing a detected value detected by the pressure sensor to a predetermined threshold value;
a step of correcting the predetermined threshold value in accordance with the driving pressure of the fluid controller detected by the driving pressure sensor; and
a step for forwarding a result of the anomaly of the fluid controller to a server.

13. A fluid controller unit for detecting an anomaly, comprising:

a flow path;
a closed space isolated from the flow path by an isolation member;
a leak port capable of communicating the closed space to an external part;
a pressure sensor for detecting the pressure in the closed space;
a driving pressure sensor for detecting a driving pressure of the fluid controller;
a detachable mechanism for detachably fixing the pressure sensor to the leak port and blocking the leak port from the external part in the state of being fixed; and
a processing module for executing a predetermined information processing,
wherein the processing module is configured to execute a discrimination process for determining an anomaly of the fluid controller by comparing a detection value detected by the pressure sensor to a predetermined threshold value, a correction process for correcting the predetermined threshold value in accordance with the driving pressure of the fluid controller detected by the driving pressure sensor, and a communication process for transmitting a discrimination result of the anomaly of the fluid controller to a server.

14. A fluid controller anomaly control system, comprising:

a fluid controller including a flow path;
a closed space isolated from the flow path by an isolation member;
a leak port capable of communicating the closed space to an external part; and
an information providing device detachably fixed to the fluid controller, configured to communicate with a server,
wherein the information providing device comprises a pressure sensor for detecting pressure in the closed space; an open/close detection mechanism for detecting an open/close operation of the fluid controller; a communication module for transmitting a detection value detected by the pressure sensor to the server; and a detachable mechanism for detachably fixing the pressure sensor to the leak port and blocking the leak port from the external part in the state of being fixed, and
wherein the server is configured to execute a discrimination process for determining an anomaly of the fluid controller by comparing the detection value received from the information providing device to a predetermined threshold value, and a correction process for correcting the predetermined threshold value in accordance with the open/close operation of the fluid controller received from the information providing device.

15. A fluid controller anomaly detection method for detecting anomaly of a fluid controller comprising a flow path; a closed space isolated from the flow path by an isolation member; a leak port capable of communicating the closed space to an external part; with a device for detachably fixing a pressure sensor to the leak port and blocking the leak port from the external part in the state of being fixed, comprising:

a step of detecting pressure of the closed space;
a step of detecting an open/close operation of the fluid controller by the open/close detection mechanism;
a step of determining an anomaly of the fluid controller by comparing a detected value detected by the pressure sensor to a predetermined threshold value;
a step of correcting the predetermined threshold value in accordance with the open/close operation of the fluid controller detected by the open/close mechanism; and
a step for forwarding a result of the anomaly of the fluid controller to a server.

16. A fluid controller unit for detecting an anomaly, comprising:

a flow path;
a closed space isolated from the flow path by an isolation member;
a leak port capable of communicating the closed space to an external part;
a pressure sensor for detecting the pressure in the closed space;
an open/close detection mechanism for detecting an open/close operation of the fluid controller;
a detachable mechanism for detachably fixing the pressure sensor to the leak port and blocking the leak port from the external part in the state of being fixed; and
a processing module for executing a predetermined information processing,
wherein the processing module is configured to execute a discrimination process for determining an anomaly of the fluid controller by comparing a detection value detected by the pressure sensor to a predetermined threshold value, a correction process for correcting the predetermined threshold value in accordance with the open/close operation of the fluid controller detected by the open/close detection mechanism, and a communication process for transmitting a discrimination result of the anomaly of the fluid controller to a server.

* * * * *